(12) United States Patent
Erichsen

(10) Patent No.: US 9,644,613 B2
(45) Date of Patent: May 9, 2017

(54) WIND TURBINE LIGHTING PROTECTION SYSTEM AND WIND TURBINE BLADE

(75) Inventor: Hans V. Erichsen, Århus (DK)

(73) Assignee: Vestas Wind Systems A/S, Aarhus N (DK)

( * ) Notice: Subject to any disclaimer, the term of this patent is extended or adjusted under 35 U.S.C. 154(b) by 910 days.

(21) Appl. No.: 13/882,146

(22) PCT Filed: Oct. 26, 2011

(86) PCT No.: PCT/DK2011/050407
§ 371 (c)(1),
(2), (4) Date: Jul. 11, 2013

(87) PCT Pub. No.: WO2012/055418
PCT Pub. Date: May 3, 2012

(65) Prior Publication Data
US 2013/0280073 A1    Oct. 24, 2013

Related U.S. Application Data

(60) Provisional application No. 61/409,170, filed on Nov. 2, 2010.

(30) Foreign Application Priority Data

Oct. 27, 2010    (DK) ................................ 2010 70459

(51) Int. Cl.
   *F03D 80/30*      (2016.01)
   *F03D 1/06*      (2006.01)

(52) U.S. Cl.
   CPC ........... *F03D 80/30* (2016.05); *F03D 1/0675* (2013.01); *F05B 2240/122* (2013.01); *Y02E 10/721* (2013.01)

(58) Field of Classification Search
CPC ..... F03D 1/0675; F03D 7/022; F03D 11/0033
See application file for complete search history.

(56) References Cited

U.S. PATENT DOCUMENTS

| | | | |
|---|---|---|---|
| 6,612,810 B1 * | 9/2003 | Olsen | F03D 11/0025 415/4.5 |
| 7,914,259 B2 * | 3/2011 | Godsk | F03D 1/0641 416/146 R |

(Continued)

FOREIGN PATENT DOCUMENTS

| | | |
|---|---|---|
| DE | 102009003405 A1 | 8/2009 |
| EP | 1830063 A1 | 9/2007 |

(Continued)

OTHER PUBLICATIONS

International Search Report; Mar. 27, 2012; PCT/DK2011/050407.

(Continued)

*Primary Examiner* — John K Fristoe, Jr.
*Assistant Examiner* — Cameron Corday
(74) *Attorney, Agent, or Firm* — Patterson + Sheridan, LLP

(57) ABSTRACT

Method and apparatus for cooling a hydrocarbon stream. The present invention relates to a wind turbine lightning protection system and to a wind turbine blade comprising a wind turbine lightning protection system. A lightning protection system is provided for use in a wind turbine blade, comprising a lightning conductor located along an interior portion of the wind turbine blade and being coupled to ground, at least one receptor module arranged on an external surface of the wind turbine blade, the receptor module being electrically connected to the lightning conductor, and a vortex generator strip arranged in a longitudinal direction on the external surface of the wind turbine blade, the vortex generator strip being adapted to attract and receive a lightning strike and to transmit an electrical current from the (Continued)

lightning strike to the receptor module and thereafter to ground through the lightning conductor.

18 Claims, 5 Drawing Sheets

(56) References Cited

U.S. PATENT DOCUMENTS

| | | | |
|---|---|---|---|
| 2008/0145229 A1* | 6/2008 | Llorente Gonzalez | F03D 1/065 416/230 |
| 2010/0008787 A1* | 1/2010 | Godsk | F03D 1/0641 416/223 R |
| 2010/0047070 A1* | 2/2010 | Slot | F03D 1/065 416/146 R |
| 2012/0141277 A1* | 6/2012 | Yarbrough | F03D 11/0033 416/146 R |

FOREIGN PATENT DOCUMENTS

| | | |
|---|---|---|
| EP | 2063106 A1 | 5/2009 |
| EP | 2110552 A1 | 10/2009 |
| JP | 2003254225 A | 9/2003 |
| WO | 2005/071262 A1 | 8/2005 |
| WO | 2007140771 A1 | 12/2007 |
| WO | 2008113349 A2 | 9/2008 |
| WO | 2008113350 A2 | 9/2008 |

OTHER PUBLICATIONS

Search Report and Opinion (Danish Patent & Trademark Office); Jun. 29, 2011; PA 2010 70459.

Lars Hansen, et al.: "Improved Lighting Protection System Enhances the Reliability of Multi-MW Blades", LM Glasfiber A/S, Lunderskov, DK, www.lmglasfiber.com, Oct. 2005, pp. 1-11.

* cited by examiner

WIND TURBINE LIGHTING PROTECTION SYSTEM AND WIND TURBINE BLADE

TECHNICAL FIELD

The present invention relates to a wind turbine lightning protection system and to a wind turbine blade comprising a wind turbine lightning protection system.

BACKGROUND OF THE INVENTION

Lightning strike is a major cause of concern for wind turbine sustainability. With wind turbines being located in remote areas for the best wind catchment, the turbines are a particularly attractive target for lightning strikes due to their height and material composition.

Wind turbine blades typically encompass advanced lightning protection systems, some of which comprise features such as lightning receptors, lightning down conductor for leading lightning to ground, and other aspects in attempting to prevent lightning strikes from damaging the wind turbine blade.

It is thus an object of the present invention to provide a lightning protection system for a wind turbine blade that provides an effective option for lightning strike protection.

SUMMARY OF THE INVENTION

According to an aspect of the invention, there is provided a lightning protection system for use in a wind turbine blade, comprising a lightning conductor located along an interior portion of the wind turbine blade and being coupled to ground, at least one receptor module arranged on an external surface of the wind turbine blade, the receptor module being electrically connected to the lightning conductor, and a vortex generator strip arranged in a longitudinal direction on the external surface of the wind turbine blade, the vortex generator strip being adapted to attract and receive a lightning strike and to transmit an electrical current from the lightning strike to the receptor module and thereafter to ground through the lightning conductor.

According to another aspect, a wind turbine blade is provided, comprising a lightning protection system.

According to yet another aspect, a wind turbine is provided, comprising a wind turbine blade, further comprising a lightning protection system.

BRIEF DESCRIPTION OF DRAWINGS

Embodiments of the present invention are explained by way of example with reference to the accompanying drawings, in which.

DETAILED DESCRIPTION OF EMBODIMENTS

Figure 1:
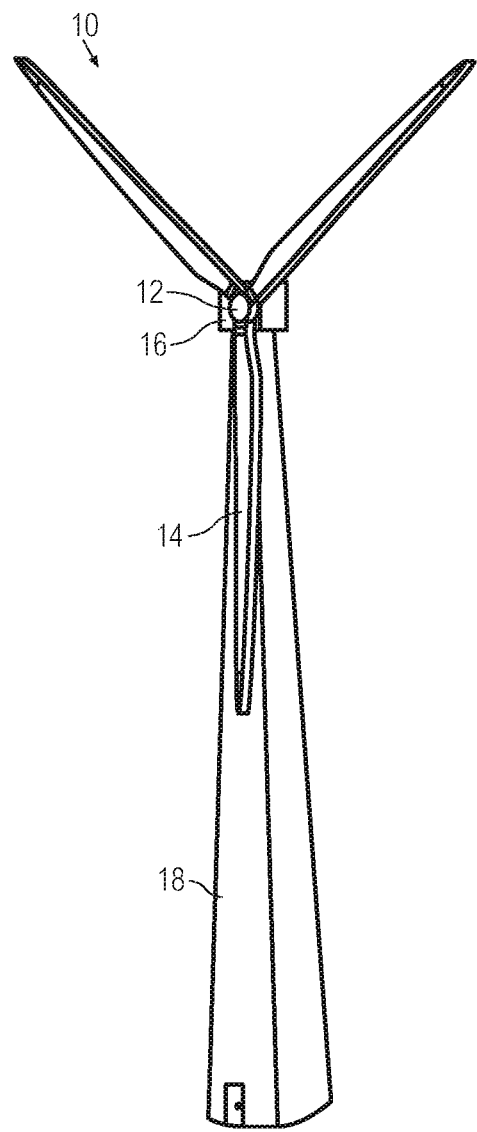
FIG. 1 illustrates a general structure of a wind turbine.

Certain general points are now discussed in relation to the invention.

As indicated above, according to an aspect of the invention, a lightning protection system is provided, for use in a wind turbine blade.

As noted, lightning strike damage is a critical area of concern in wind turbine and wind turbine blade design. Much work is done in designing a lightning protection system that is able to provide a suitable target for lightning to strike, as well as to provide the lightning strike current a smooth path to ground, thus reducing or preventing any damage from the high-voltage lightning strike.

Vortex generators provide an advantageous aerodynamic option by acting as turbulence generating means and broaden the frequency band at which acoustic noise is generated during rotation of the wind turbine blades. The vortex generators also may transform part of the generated noise frequencies from low frequency to high frequency. The above makes noise generated by the wind turbine blades less irritating to the human ear as well as reduce the overall noise emission.

Typically, a row, or two rows of vortex generators are provided on a wind turbine blade, the vortex generators being uniform and of relatively constant height. The vortex generators are also typically of a low profile, for example, 0.5% of a chord length of the blade. This allows the vortex generators to sufficiently reduce noise emission, but at the same time, not produce drag on the blade.

In the present invention, a vortex generator strip is arranged in a longitudinal direction on the external surface of the wind turbine blade, the vortex generator strip being adapted to attract and receive a lightning strike and to transmit the electrical current from the lightning strike to the receptor module and thereafter to ground through the lightning conductor.

It is advantageous and efficient to utilize an existing wind turbine blade feature such as a vortex generator strip and adapting it to attract and receive a lightning strike. The primary purpose of the wind turbine blade is to catch the wind and drive the electrical generator, and the ability for smooth rotation is critical in relation to power production. As such, any additional feature which is intended to be integrated onto the wind turbine blade must not negatively affect the wind capture and rotation of the rotor. As above, the vortex generators have been designed to balance noise reduction without introducing much drag on the blade.

In standard wind turbine blades, the lightning protection system generally comprises a handful of lightning receptors for lightning strike attraction. Providing a vortex generator strip on the surface of the blade, and thus covering more of the blade surface area, increases the lightning strike attraction capability of the lightning protection system.

The vortex generator strip of the present invention is also adapted to transmit electrical current from a lightning strike to the receptor module and thereafter to ground trough the lightning conductor. This reduces any complicated redesign to the lightning protection system, which takes a long time and many phases of testing before it can be considered ready for market. As such, this allows the present invention to be a retrofit solution to the existing lightning protection system of installed wind turbine blades.

In an embodiment, the vortex generator strip comprises multiple vortex generators mounted on a flat band. This allows the vortex generator strip to be comprised of a row of small vortex generators mounted on a hand to create a strip, and to be mounted onto the blade. Having such an arrangement overcomes the need to have single or multiple large turbulence generating means, which typically create excessive drag and negatively affect the blade aerodynamic profile.

In another embodiment, each vortex generator in the vortex generator strip comprises a narrow profile that extends perpendicularly from the external surface of the wind turbine blade. Having a narrow profile that extends perpendicularly allows for the air or wind to pass smoothly about the vortex generator, and as such, drag is minimized, while at the same causing the air passing to end up as a high momentum boundary layer flow.

Lightning is formed in most cases by a buildup of charge at the base of a storm cloud. Such a buildup leads to ionization and leaders propagating towards ground, and as it progresses, imposes a rapidly increasing transient electric field on a ground structure, in this case the wind turbine, and specifically, a wind turbine blade. This leads to a breakdown of the air around the structure and subsequently an oppositely-charged streamer is discharged. The oppositely-charged streamer continues to evolve upwards to being an oppositely-charged leader and finally intercepts the leader, and thereafter establishes a low impedance path to the ground structure, which allows for the return stroke to be propagated.

In an embodiment, at least one part of the vortex generator strip is composed of a conductive material. Having components of the vortex generator strip to be composed of a conductive material not only the promotes the formation of streamers at the vortex generator strip, but also allows lightning strike current a path of reduced resistance to travel for transmission to the receptor module and the lightning down conductor. Advantageously, this further allows the launching of stable upward oriented leaders and ensures that these leaders extend furthest into the air gap between the vortex generator strip and the charge region in the lightning leader.

In a further embodiment, the conductive material comprises at least one of: iron, stainless steel, aluminum, and copper.

In an embodiment, the vortex generator strip is arranged on the external surface of the wind turbine blade using adhesive. Such a feature allows for the easy installation of the vortex generator strip onto a wind turbine blade, as well as allowing for retrofit on existing blades. Advantageously, the vortex generator strip provides a solution for acoustic noise emission reduction and lightning strike protection without an overhaul of the design of a wind turbine blade.

This feature of being removable and replaceable is also advantageous in the design of lightning protection systems. The vortex generator strip, acting as a lightning receptor module, may be worn out over the lifetime of the turbine, and is therefore advantageous that the vortex generator strip be replaceable.

In another embodiment, the lightning protection system further comprises a conductive band on the external surface of the wind turbine blade for transmitting the electrical current from the vortex generator strip to the receptor module. The conductive band provides a conductive path for a lightning strike current to pass from the vortex generator strip to the receptor module. This is advantageous in that the conductive band allows for the vortex generator strip to be aerodynamically situated for the best noise reduction effect while considering drag. Further, providing such a conductive band between a vortex generator strip and a lightning receptor may prevent damage to the vortex generator strip during a lightning strike as the conductive band provides a path of low resistance for the lightning strike current to pass through before entry into the lightning receptor.

In an embodiment, the conductive band contacts the at least one of the vortex generator strip and the receptor module. Transmission by contact provides for a path of low electrical resistance for the lightning current and is considered an effective way of conducting a current to ground.

In another embodiment, the conductive band is arranged at a predetermined distance from the at least one of the vortex generator strip and the receptor module, thereby transmitting the electrical current through a spark gap connection.

A spark gap can be regarded as a highly nonlinear component: When the voltage across the spark-gap electrodes is small, so that no spark is fired, the spark gap presents a galvanic interruption; its resistance is virtually infinite. However, when the voltage across the spark-gap electrodes becomes high, a spark is fired and current can flow through the spark's plasma; the spark gap's resistance is then virtually zero.

In another embodiment, the receptor module is exposed on the external surface of the wind turbine blade directly above a blade spar running along the length of the blade. This allows the receptor module to "intercept" lightning strikes to the blade spar, by promoting the formation of positive streamers due to its conductive nature.

In an embodiment, the lightning protection system further comprises at least two receptor modules, and the vortex generator strip is electrically connected to the at least two receptor modules. As lightning receptors modules on the wind turbine blade are relatively well spaced out, this allows the provision of a longer length of the vortex generator strip, thereby allowing for better lightning attractiveness, as well as multiple conducting paths for a lightning strike current to be dissipated to ground.

The embodiments disclosed herein do not only pertain to lightning protection systems as such, but also to wind turbine blades comprising such lightning protection systems. Further, the invention also pertains to wind turbines comprising wind turbine blades further comprising such lightning protection systems.

Embodiments of the present invention will now be described with relation to the figures.

A wind turbine 10 is illustrated in FIG. 1. The wind turbine 10 comprises a hub 12 connected to at least one blade 14. Any number of blades may be used, but there are typically provided three blades 14. The hub 12 is rotatably mounted on a nacelle 16 and may otherwise be known as a rotor. The nacelle 16 is supported by a tower 18, which is established on a stable surface. Alternatively, the wind turbine may be an offshore model, the tower 18 of such an offshore model being installed either on the sea floor or on platforms stabilized on or above the sea level.

The wind turbine 10 comprises mechanisms for adjusting the pitch of the blade 14 to increase or reduce the amount of wind energy captured by the blade 14. Pitching adjusts the angle at which the wind strikes the blade 14. The hub 12 typically rotates about a substantially horizontal axis along a drive shaft (not shown) extending from the hub 12 to the nacelle 16. The drive shaft is usually coupled to a rotor of a generator by a gear box both of which are housed in the nacelle 16.

Typically, the blade 14 may vary from a length of 20 meters to 60 meters, and beyond. Such blades are precisely manufactured to ensure that the rotor remains balanced for optimum aerodynamic performance. The blades are usually produced with materials such as wood-carbon composites, glass-fiber reinforced plastic, carbon fiber composites, or any other materials. The manufacturing techniques also include pre-impregnation of the composite fibers ("pre-preg"), coatings, paints, foams, woods, etc.

The lightning protection system for use in the wind turbine blade is integrated into the manufacturing process, the end product being that the manufactured blade comprises a fully operable lightning protection system. For example, a down conductor being laid out along the blade spar; lightning receptors being introduced into the blade shells prior to joining, and various other steps.

Figure 2:
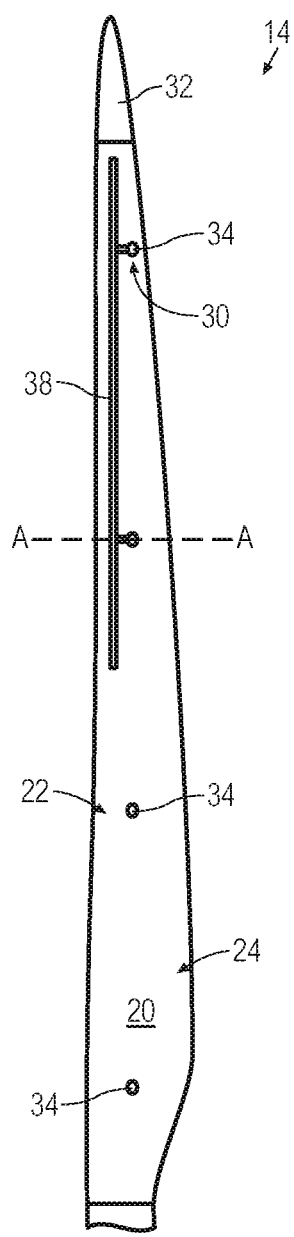
FIG. 2 illustrates a wind turbine blade according to an embodiment.

The above manufacturing techniques used combine different materials which have different electrical properties and are optimized for lightning protection, depending on where they are located in the blade construction FIG. 2 illustrates a wind turbine blade 14 according to an embodiment. A lee-ward surface 20 of blade 14 is shown, and a leading edge 22 and a trailing edge 24 is also indicated for orientation of the blade. A wind-ward surface of the blade 14 is located on the underside of lee-ward surface 20. Surface 20 of the wind turbine blade 14 may be coated with a dirt resistive paint which is electrically non-conductive.

Blade 14 comprises a lightning protection system 30 according to an embodiment. Lightning protection system 30 comprises a lightning receptor located at or near the tip of the wind turbine blade, or tip receptor 32. Tip receptor 32 may be in the form of a metal cap on the tip, or a circular receptor which is inset into the blade near the tip, or any other kind of receptor near the tip of the blade, for attraction and conduction of a lightning strike.

Lightning protection system 30 further comprises a receptor module 34. The side receptor 34, is arranged inside of the blade 14, and has a surface being exposed to the exterior through the blades shell. The exposed surface is flush with the surface 20 of the blade 14. The side receptor 34, is located along a central line of the blade 14 and is located above a blade spar 26 (see FIG. 3) and connected within the blade 14 to a lightning down conductor 36, which will be described in further detail below. The lightning down conductor 36 extends along the blade spar 26 from substantially the blade tip to the root of the blade. In this embodiment, side receptors 34 are located every 3 meters, originating from the tip of the blade. In this case, there are five side receptors 34, but any number may be possible. A function of side receptor 34 is to increase attractiveness of the lightning protection system 30 to a lightning strike. Side receptors 34 may also be located on any other portion of lee-ward side 20 or wind-ward side of the blade 14. Side receptor 34 is metallic in nature and may be made of copper or any other metal.

Also located on the lee-ward surface 20 of the wind turbine blade 14 is a vortex generator strip 38. Vortex generator strip 38 is an elongated flat band 42 of vortex generators 40 (see FIG. 4), each vortex generator being defined as a feature which affects the aerodynamic flow of air over the blade. Generally, vortex generators generate a vortex in the boundary layer of the airflow over the lee-ward side of the blade. Vortex generator 40 is provided in the form of a substantially delta-shaped protrusion, and slanted with respect to the transverse direction of the blade. In the embodiment, neighboring vortex generators are slanted in opposite directions to one another, and an angle of 15°. Other designs and arrangements are possible in other embodiments.

The vortex generator strip 38 is arranged in a longitudinal direction along the length of the wind turbine blade 14, near the leading edge 22 of the blade. In this embodiment, the vortex generator strip 38 is 20 mm wide and has a thickness of 3.5 mm. The height of the vortex generators 40 may also contribute another 1.5 mm to this thickness. Preferably, the vortex generator strip should have a cross-sectional area of at least 50 mm$^2$ for effective conduction of lightning current, but other dimensions may be possible. The vortex generator strip 38 extends from the region between the tip receptor 32 and the first side receptor 34, to the region after the second side receptor. The length of the vortex generator strip is not restricted, but is based on design factors such as lightning protection efficiency and aerodynamics. Vortex generator strip 38 may also be a single elongated strip or comprise of multiple shorter strips.

The vortex generators 40 in the present embodiment are formed as part of the vortex generator strip 38, i.e. the vortex generators 40 are integrally formed to protrude from the flat band 42. Alternatively, vortex generators 40 may be separately attached to the flat band. Alternatively, a row of vortex generators 40 may also be attached individually to the surface of the wind turbine blade 14 to form a strip of vortex generators.

In this embodiment, the entire vortex generator strip 38, comprising both the flat band 42 and the vortex generators 40, is composed entirely of copper. Any conductive or metallic material can be used. As an alternative, the flat band 42 could be made of metal while the vortex generators 40 are of a non-conductive material. The vortex generators 40 could also be solely made up of a conductive material. The flat band 42 and the vortex generators 40 could also be coated with a metallic paint. The vortex generator 40 is connected to the side receptor 34 by means of a conductive band 46.

Figure 3:
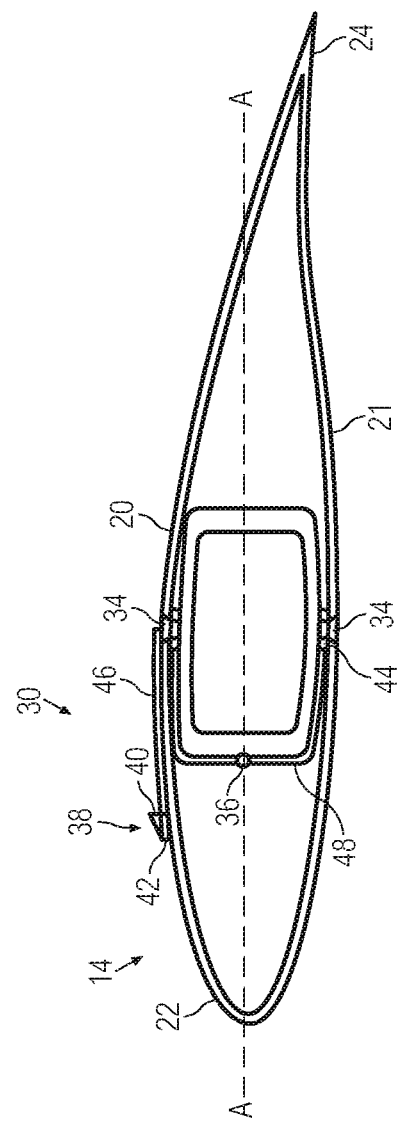
FIG. 3 illustrates a cross-sectional view of a wind turbine blade according to an embodiment.

FIG. 3 illustrates a cross-section of the blade 14 across line A-A as indicated on FIG. 2. Two side receptors 34 are shown as provided for the lightning protection system 30, one on the lee-ward side 20 of the blade and another on the wind-ward side 21. As indicated, the side receptors 34 are located adjacent, and not contacting, blade spar 26. The side receptors 34 are installed by means of screw formations through the shell of the blade 14 and are secured to a receptor base 44 on the interior of the blade 14. The receptor base 44 is thereafter connected to the down conductor 36 running along the blade spar 26 with a braid of copper wires 48. There may also be a block of low-density polyethylene foam holding the receptor base 44 in place. Any other lightning protection system arrangements may also be possible.

The down conductor 36 is a relatively thick bundle of copper wires running along the length of the blade spar 26, for the purpose of high voltage lightning strike current transmission. As indicated above, the down conductor 36 is connected to the side receptor 34 by a copper wire braid 48. The connection from the down conductor 36 to the copper wire braid 48 is formed with a high quality weld or a pressed connection. The down conductor 36 may or may not comprise additional insulation about the bundle of copper wires, depending primarily on the distance from the blade tip. The ground conductor 36 is thereafter coupled to ground through connections at the root of the blade 14, the nacelle 16, and thereafter down the tower 18.

FIG. 3 also illustrates vortex generator strip 38 being position on the lee-ward surface 20 of blade 14. Flat band 42 is mounted on the blade surface 20 and a profile of a vortex generator 40 protrudes from the flat band 42. The vortex generator strip 38, and in particular, flat hand 42, is adhesively affixed on blade surface 20. Other means for mounting may also be possible. Installation of the vortex generator strip 38 may also be integrated into the production process of the blade 14, and need not be limited to a post-production procedure.

The conductive band 46 is also provided adjacent to the vortex generator strip 38 and electrically couples the vortex generator strip 38 to side receptor 34. Similar to the process above, conductive band 46 is mounted onto blade surface 20 by adhesive, but may be mounted with any other mounting means, as long as the electrical conductivity between the vortex generator strip 38 and the side receptor 34 is not degraded. Conductive band 46 may be any type of conductor which is able to provide an electrical connection between the vortex generator strip 38 and side receptor 34, for example a band of metallic paint on the blade surface 20.

Figure 4:
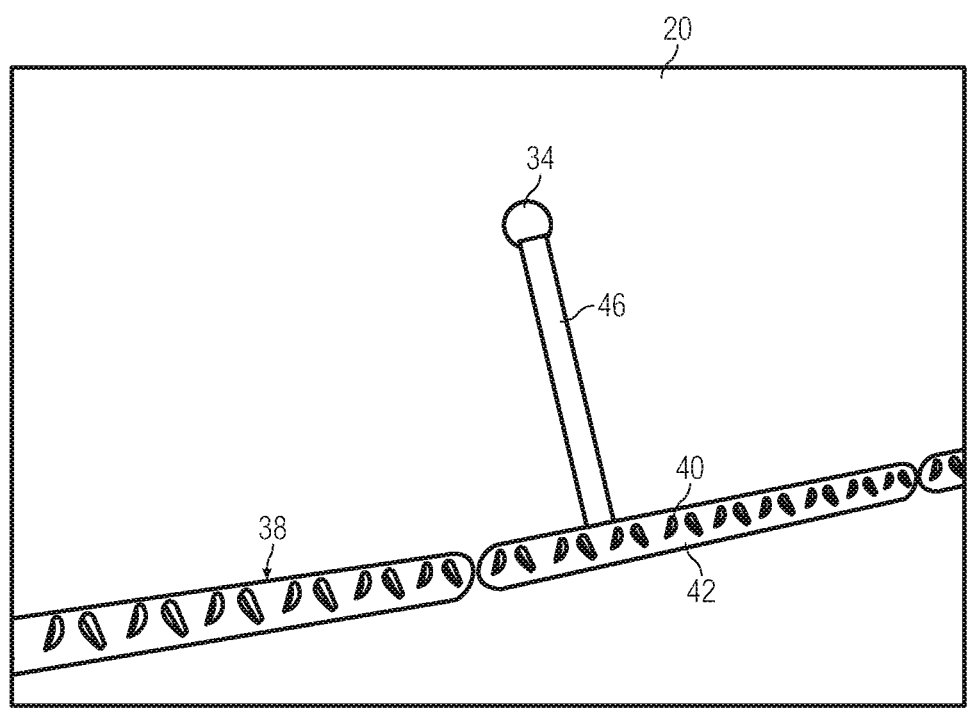
FIG. 4 illustrates a close-up view of a wind turbine blade according to at embodiment.

FIG. 4 illustrates a close up view of the wind turbine blade 14 of the present embodiment. The side receptor 34 is exposed on the lee-ward surface 20 of blade 14. The vortex generator strip 38 is shown to comprise multiple vortex generators 40 on the flat band 42. As described earlier, vortex generator 40 comprises a substantially delta shape and is slanted in the opposite direction with a neighboring vortex generator in the transverse direction of the blade. The peak of each vortex generator 40 is also positioned to face the trailing edge 22 of the blade 14.

The conductive band 46 is illustrated to be laid or affixed on the surface 20 of blade 14. Conductive band 46 is shown to be placed adjacent to the vortex generator strip 38 and overlapping with the side receptor 34, but may alternatively be overlapping both, as long as there is a physical connection and subsequently electrical connection for allowing lightning current from a lightning strike to the vortex generator strip 38 to be conducted to the side receptor 34 and subsequently to the down conductor 36.

Figure 5:
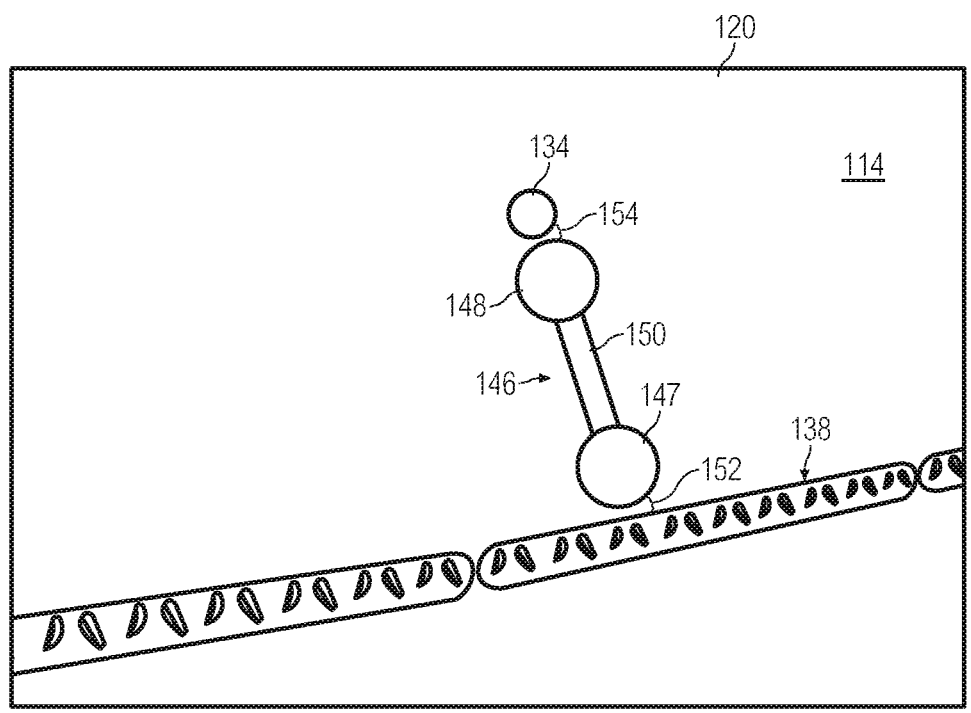
FIG. 5 illustrates a close-up view of a wind turbine blade according to another embodiment.

FIG. 5 illustrates a close up view of a wind turbine blade 114 according to another embodiment. Similarly, a vortex generator strip 138 and a side receptor 134 are located on the lee-ward surface 120 of wind turbine blade 114. A conductive band 146 is affixed on surface 20 of the blade 14 for providing a conducting path for electrical transmission between the vortex generator strip 138 and the side receptor 134. As indicated above, surface 20 of the wind turbine blade 14 may be coated with a dirt resistive paint which is electrically non-conductive. As such, it is noted that an insulation layer of electrically non-conductive paint and air separates the conductive band 146 from the vortex generator strip 138 and the side receptor 134.

The conductive band 146 comprises two electrodes 147, 148 on either end of an elongated path 150, and is spaced apart from the vortex generator strip 138 and the side receptor 134, creating spark gaps 152, 154. The distance between the electrodes 147, 148 and the vortex generator strip 138 and side receptor 134 is predetermined and is directly related to the spark gap breakdown voltage. In the event that lightning strikes the blade 114 at the vortex generator strip 138, the voltage difference across the spark gap 152 quickly rises and fires the spark gap 152. In firing the spark gap 152, a spark forms in the air above the spark gap 152 between the vortex generator strip 138 and electrode 147 which then ionizes the air and allows for electrical current flow. Current transmission across spark gap 154 between electrode 148 and side receptor 134 occurs in the same way. Spark gap 152 and 154 are of a range between 0.1 mm to 20 mm, depending on static discharge intentions.

In other embodiments, the conductive band 146 is in direct physical connection either the vortex generator strip 138 or the side receptor 134 and has a spark gap connection with the other. Alternatively, the vortex generator strip may be located at a proximity to the side receptor such that the arrangement provides for a spark gap connection between the two. In yet another embodiment, the vortex generator strip is laid directly onto the side receptor and forms an electrical connection.

In the present embodiment, electrodes 147, 148 are of a round form, which reduces the occurrence of corona discharge, as well as to provide a more consistent breakdown voltage. However, the electrodes may be of any shape as long as it allows for electrical transmission over the gap once the breakdown voltage is achieved. The conductive band 146, and electrodes 147, 148 are formed from copper, but it is envisaged that the electrodes may be made of any material which is burn resistant, such as tungsten, or a comparable alloy.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art. The scope of the invention is thus indicated by the appended claims and all changes which come within the meaning and range of equivalency of the claims are therefore intended to be embraced.

PARTS LIST 10 wind turbine
12 hub
14 blades
16 gear box
18 tower
20 Lee-ward surface
21 Wind-ward surface
22 Leading edge
24 Trailing edge
26 Blade spar
30 Lightning protection system
32 Tip receptor
34 Side receptor
36 Down conductor
38 Vortex generator strip
40 Vortex generator
42 Flat band
44 Receptor base
46 Conductive band
48 Wire braid
147 Electrode
148 Electrode
150 Path
152 Spark gap
154 Spark gap

The invention claimed is:

1. A lightning protection system, for use in a wind turbine blade, comprising:
   a lightning conductor located along an interior portion of the wind turbine blade and being coupled to ground;
   at least one receptor module extending from the interior portion to an external surface of the wind turbine blade, the receptor module being electrically connected to the lightning conductor; and
   a vortex generator strip arranged in a longitudinal direction on the external surface of the wind turbine blade and electrically connected to the at least one receptor module, wherein the vortex generator strip comprises an electrically conductive band arranged on the external surface of the wind turbine blade and a plurality of electrically conductive vortex generators protruding from the electrically conductive band, and wherein electrical current from a lightning strike received by the vortex generator strip is transmitted to ground through the at least one receptor module and the lightning conductor, wherein the vortex generator strip is arranged between a leading edge and a trailing edge of the wind turbine blade.

2. A lightning protection system according to claim 1, wherein each vortex generator in the vortex generator strip comprises a narrow profile that extends perpendicularly from the external surface of the wind turbine blade.

3. A lightning protection system according to claim 1, wherein the vortex generator strip is composed of a conductive material comprising at least one of: iron, stainless steel, aluminum, and copper.

4. A lightning protection system according to claim 1, wherein the vortex generator strip is arranged on the external surface of the wind turbine blade using adhesive.

5. A lightning protection system according claim 1, further comprising a conductive band on the external surface of the wind turbine blade for transmitting the electrical current from the vortex generator strip to the receptor module.

6. A lightning protection system according to claim 5, wherein the conductive band contacts the at least one of the vortex generator strip and the receptor module.

7. A lightning protection system according to claim 5, wherein the conductive band is arranged at a predetermined distance from the at least one of the vortex generator strip and the receptor module, thereby transmitting the electrical current through a spark gap connection.

8. A lightning protection system according to claim 1, wherein the receptor module is exposed on the external surface of the wind turbine blade directly above a blade spar running along the length of the blade.

9. A lightning protection system according to claim 1, further comprising at least two receptor modules, wherein the vortex generator strip is electrically connected to the at least two receptor modules.

10. The lightning protection system according to claim 1, wherein the plurality of electrically conductive vortex generators protruding from the electrically conductive band comprise a plurality of delta-shaped protrusions.

11. The lightning protection system according to claim 10, wherein the plurality of delta-shaped protrusions are slanted with respect to a transverse direction of the wind turbine blade.

12. The lightning protection system according to claim 11, wherein neighboring delta-shaped protrusions are slanted in opposite directions.

13. The lightning protection system according to claim 12, wherein a slant angle of the vortex generators is 15° from the transverse direction of the wind turbine blade.

14. The lightning protection system according to claim 11, wherein a slant angle of the vortex generators is 15° from the transverse direction of the wind turbine blade.

15. The lightning protection system according to claim 10, wherein a peak of each delta-shaped vortex generator is positioned to face a trailing edge of the wind turbine blade.

16. The lightning protection system according to claim 1, wherein the plurality of vortex generators include airfoil-shaped cross-sectional profiles.

17. An apparatus, comprising:
a wind turbine blade; and
a lightning protection system, comprising:
    a lightning conductor located along an interior portion of the wind turbine blade and being coupled to ground;
    at least one receptor module extending from the interior portion to an external surface of the wind turbine blade, the receptor module being electrically connected to the lightning conductor; and
    a vortex generator strip arranged in a longitudinal direction on the external surface of the wind turbine blade and electrically connected to the at least one receptor module, wherein the vortex generator strip comprises an electrically conductive band arranged on the external surface of the wind turbine blade and a plurality of electrically conductive vortex generators protruding from the electrically conductive band, and wherein electrical current from a lightning strike received by the vortex generator strip is transmitted to ground through the at least one receptor module and the lightning conductor, wherein the vortex generator strip is arranged between a leading edge and a trailing edge of the wind turbine blade.

18. A wind turbine, comprising:
a tower;
a nacelle disposed on the tower and at least partially housing a rotor;
a hub disposed on the rotor;
a wind turbine blade connected to the hub;
a lightning protection system disposed on the wind turbine blade; the lightning protection system comprising:
    a lightning conductor located along an interior portion of the wind turbine blade and being coupled to ground;
    at least one receptor module extending from the interior portion to an external surface of the wind turbine blade, the receptor module being electrically connected to the lightning conductor; and
    a vortex generator strip arranged in a longitudinal direction on the external surface of the wind turbine blade and electrically connected to the at least one receptor module, wherein the vortex generator strip comprises an electrically conductive band arranged on the external surface of the wind turbine blade and a plurality of electrically conductive vortex generators protruding from the electrically conductive band, and wherein electrical current from a lightning strike received by the vortex generator strip is transmitted to ground through the at least one receptor module and the lightning conductor, wherein the vortex generator strip is arranged between a leading edge and a trailing edge of the wind turbine blade.

* * * * *